(12) United States Patent
Holl (10) Patent No.: US 9,904,989 B2
(45) Date of Patent: Feb. 27, 2018

(54) METHOD FOR GENERATING A DIGITAL IMAGE OF AT LEAST ONE SECTION OF A VALUE DOCUMENT

(75) Inventor: Norbert Holl, Germering (DE)

(73) Assignee: GIESECKE + DEVRIENT CURRENCY TECHNOLOGY GMBH, Munich (DE)

( * ) Notice: Subject to any disclaimer, the term of this patent is extended or adjusted under 35 U.S.C. 154(b) by 232 days.

(21) Appl. No.: 13/996,676

(22) PCT Filed: Dec. 21, 2011

(86) PCT No.: PCT/EP2011/006490
§ 371 (c)(1),
(2), (4) Date: Jun. 21, 2013

(87) PCT Pub. No.: WO2012/084240
PCT Pub. Date: Jun. 28, 2012

(65) Prior Publication Data
US 2013/0301086 A1 Nov. 14, 2013

(30) Foreign Application Priority Data
Dec. 22, 2010 (DE) .......... 10 2010 055 697

(51) Int. Cl.
*G06T 5/00* (2006.01)
*G07D 7/20* (2016.01)
*H04N 1/409* (2006.01)

(52) U.S. Cl.
CPC .......... *G06T 5/003* (2013.01); *G07D 7/2008* (2013.01); *H04N 1/409* (2013.01)

(58) Field of Classification Search
CPC .................................. G07D 7/2008
See application file for complete search history.

(56) References Cited

U.S. PATENT DOCUMENTS

| 2002/0131093 A1 | 9/2002 | Horiuchi et al. |
| 2006/0023943 A1 | 2/2006 | Makino |
| 2007/0242319 A1* | 10/2007 | Okada ............... H04N 1/00002 358/486 |

(Continued)

FOREIGN PATENT DOCUMENTS

| DE | 10 2010 018 142 A1 | 12/2010 |
| EP | 0 601 655 A1 | 6/1994 |

(Continued)

OTHER PUBLICATIONS

Sinc Filter, Wikipedia, the free encyclopedia, Nov. 9, 2010.*

(Continued)

*Primary Examiner* — Stephen R Koziol
*Assistant Examiner* — Raphael Schwartz
(74) *Attorney, Agent, or Firm* — Justin Cassell; Workman Nydegger (57) ABSTRACT

A method for generating a digital image of at least a portion of a value document, comprises transporting the portion of the value document in a specified transport direction at a specified speed, capturing pixel regions, and generating capture pixel data allocated to integration intervals. The capture pixel data of at least one of the sequences of capture pixel data are corrected. This reduces the influences of the movement of the value document in the transport direction during the capture of capture pixel data.

13 Claims, 3 Drawing Sheets

(56) References Cited

U.S. PATENT DOCUMENTS

2009/0277962 A1 11/2009 McCloskey
2010/0202026 A1* 8/2010 Chiu .................... H04N 1/107
    358/488
2010/0245670 A1 9/2010 Takeda et al.

FOREIGN PATENT DOCUMENTS

EP    1 065 631 A1    1/2001
EP    2 124 190 A1    11/2009

OTHER PUBLICATIONS

Frasner, Bruce, A Multipass Sharpening Workflow (Real World Image Sharpening Tips From Expert Bruce Fraser), Dec. 12, 2006, Pearson Education.*
International Search Report in PCT/EP2011/006490, dated Mar. 14, 2012.
International Preliminary Report on Patentability in PCT/EP2011/006490, dated Jun. 25, 2013.

* cited by examiner

METHOD FOR GENERATING A DIGITAL IMAGE OF AT LEAST ONE SECTION OF A VALUE DOCUMENT

BACKGROUND OF THE INVENTION

The present invention relates to a method for generating a digital image of at least a portion of a value document, in particular such a method in which the value document is moved relative to a capture pixel region, and an apparatus for carrying out the method.

Within the framework of the invention value documents are understood as card- or sheet-shaped objects, which represent for example a monetary value or an authorization and which should therefore not be producible at will by unauthorized persons. Hence, they have features that are not easily produced, in particular copied, whose presence is an indication of authenticity, i.e. production by an authorized body. Some important examples for such documents of value are chip cards, coupons, vouchers, checks, shares and in particular bank notes.

For reasons of design, for distinctiveness and for protection against simple falsifications documents of value are typically provided with a graphic design, for example more or less complex patterns and/or representations and/or characters and/or combinations of characters and/or writings. The graphic design can be executed entirely or partially colored and/or black and white and/or in gray scales.

Due to the very great number of documents of value in circulation for example in the case of bank notes, detection by machine or automatic detection of the value documents or detection by machine or automatic detection of the state of the value documents is desirable. For this purpose the value documents can be transported at great speed past optical sensors in corresponding value-document processing apparatus, with the sensors capturing an image of the respective value document during the respective transport. 12

However, it has been found that images captured with high resolution in such apparatus frequently do not have the desired image quality.

SUMMARY OF THE INVENTION

It is therefore the object of the present invention to create a method for generating or determining digital images of at least portions of value document which permits a high image quality and can be carried out fast, and to make available means for carrying out the method.

The object is achieved on the one hand by a method for determining a digital image of at least a portion of a value document from sequences of capture pixel data, which are obtainable by transporting the portion of the value document in a specified transport direction at a specified speed through capture pixel regions extending in the transport direction, during said transport capturing for the capture pixel regions respectively during integration intervals of a specified sequence of integration intervals at least one specified property of optical radiation coming from the respective capture pixel region, and generating as a sequence of capture pixel data a time sequence of capture pixel data respectively allocated to the capture time intervals, said data reproducing the property of the optical radiation from the respective capture pixel region integrated over the respective integration interval and the respective capture pixel region. In the method the sequences of capture pixel data are employed as pixel data for local sequences of pixels along the transport direction for the digital image of the portion of the value document, and capture pixel data of at least one of the sequences of capture pixel data are corrected while employing capture pixel data of the same sequence that are respectively allocated to respectively different integration intervals, in such a fashion as to reduce influences of the movement of the value document in the transport direction during the capture of the capture pixel data on the capture pixel data.

The object is further achieved by a device for a determining the digital image of at least a portion of a value document from sequences of capture pixel data, which are obtainable by transporting the portion of the value document in a specified transport direction at a specified speed through capture pixel regions extending respectively in the transport direction, during said transport capturing for the capture pixel regions respectively during integration intervals of a specified sequence of integration intervals at least one property of optical radiation coming from the respective capture pixel region, and generating a time sequence of the capture pixel data respectively allocated to the capture time intervals, which reproduces the property of the optical radiation from the respective capture pixel region, integrated over the respective integration interval and the respective capture pixel region, wherein the apparatus comprises a correction device which is configured so as to execute the above-mentioned determination method.

The object is achieved on the other hand by a method for generating a digital image of at least a portion of a value document, wherein the portion of the value document is transported in a specified transport direction at a specified speed through capture pixel regions extending respectively in the transport direction, during said transport there is captured for the capture pixel regions respectively during integration intervals of at least one specified sequence of integration intervals at least one property of optical radiation coming from the respective capture pixel region, and there is generated a time sequence of capture pixel data respectively allocated to the capture time intervals, said data reproducing the property of the optical radiation from the respective capture pixel region, integrated over the respective integration interval and the respective capture pixel region, the sequences of capture pixel data are employed as pixel data for local sequences of pixels along the transport direction for the digital image of the portion of the value document, wherein capture pixel data of at least one of the sequences of capture pixel data are corrected, while employing capture pixel data of the same sequence that are allocated to respectively different integration intervals, in such a fashion as to reduce influences of the movement of the value document in the transport direction during the capture of the capture pixel data on the capture pixel data.

The object is further achieved by an apparatus for generating a digital image of at least one portion of a value document, having an image capturing device on which the portion of the value document is transportable in a specified transport direction at a specified speed through capture pixel regions extending in the transport direction, said device capturing, during said transport, for the capture pixel regions respectively during integration intervals of a specified sequence of integration intervals, at least one property of optical radiation coming from the respective capture pixel region, and generating a time sequence of capture pixel data respectively allocated to the capture time intervals, which reproduce the property of the optical radiation from the respective capture pixel region, integrated over the respective integration interval and the respective capture pixel region, and the mentioned image determination device.

The invention proceeds from a per se known capture of an image of a specified portion of a value document by transporting the portion past an image capturing device and simultaneously capturing an image of the portion with the image capturing device. More exactly the value document is transported by means of a transport device, which can preferably form part of the manufacturing apparatus, at the specified speed in the specified transport direction along a transport path. A transport at a specified transport speed and with a specified transport direction herein is also in particular understood to mean that the actual transport direction and transport speed need to conform to the specified nominal transport direction and nominal transport speed only within the usual variations of the speed of a transported value document.

By means of the image capture device disposed on the transport path there is captured optical radiation coming from the portion or, more exactly at least one specified property of this radiation, at specified capture time intervals or at specified points in time. As property preferably the intensity of the radiation is employed, particularly preferably in a specified wavelength range and/or a specified polarization. For this purpose the image capture device can have at least two capture elements disposed transversely to the transport direction, optionally also additionally offset in the transport direction.

Each of the capture elements captures optical radiation from a capture pixel region corresponding thereto, which extends both in the transport direction and transversely thereto. This results in a local resolution transversely to the transport direction. The optical radiation proceeding from respectively one capture pixel region within the specified capture time intervals is captured in an integrating fashion respectively during a specified integration interval within the respective capture time interval. The length of the integration intervals here can correspond to the length of the capture time intervals or also be smaller. The duration of the integration intervals can vary for different capture time intervals, but is preferably the same for all integration intervals. Further preferably the capture time intervals can be equally long. The image capture device thus generates the time sequence of capture pixel data, which is allocated to the respective capture pixel region and which, due to the transport of the value document, corresponds to a capture of the radiation of regions or pixels on the value document successively disposed in the transport direction. A time sequence is understood here to mean a sequence wherein the position of a datum of the sequence within the sequence reproduces the time of generation of the datum relative to the other data of the sequence. This is applicable analogously to local sequences. Thus also a local resolution in the transport direction is achieved, wherein the resolution depends on both the transport speed and on the duration of the capture time intervals as well as the duration of the capture intervals and the extension of the capture pixel regions in the transport direction. The mentioned quantities are preferably specified in dependence on each other.

It was now found that at high transport speeds optical radiation proceeding from certain regions on a value document can be captured in at least two different integration intervals, for example immediately consecutive integration intervals. Immediately consecutive integration intervals here are understood to be such integration intervals between which there lies no further integration interval. When this effect becomes too great, the time sequence of capture pixel data no longer reproduces in good approximation pixel data for a corresponding local sequence of pixels on the value document, a kind of blurring occurs instead.

It is now provided to correct capture pixel data of at least one of the sequences so as to reduce the mentioned effect. For this purpose a corresponding capture pixel values datum which corresponds to an integration interval of the sequence is corrected, while using at last one capture pixel values datum for the same capture pixel region, but a different capture duration interval of the sequence, in such a fashion as to reduce influences of the movement of the value document in the transport direction during the capture of the capture pixel data on the capture pixel data.

Thereby a good image quality is achieved in a simple fashion also at high transport speeds without having to employ particularly highly sensitive radiation receivers or particularly highly intensive illumination radiation.

The correcting can start when already all capture pixel data of a sequence are available. Alternatively, upon correcting, capture pixel data of a sequence can be corrected before all capture pixel data of the sequence are available. This offers the advantage of a particularly fast processing with only little memory space requirements for storing the data for correction.

The correcting can fundamentally take place in any desired, but suitable fashion. According to a preferred embodiment of the methods, upon the correcting of the capture pixel data of the at least one sequence upon a first correction the capture pixel data for at least one of the integration intervals of the sequence of the integration intervals are first changed in dependence on the capture pixel data of the same sequence for one of the capture duration intervals that precedes, preferably immediately precedes, the integration interval, or one of the integration intervals that follows, preferably immediately follows the integration interval, in such a fashion as to reduce the integrated property represented by the capture pixel data. This embodiment offers the advantage of a simple implementation.

In this correction parameters can be used that need to be determined suitably. Such a determination is in principle possible experimentally for the given conditions. However, it is particularly preferred that the changing of the capture pixel data upon the first correction takes place additionally in dependence on the transport speed and/or of the length of the integration interval and/or the extension of the capture pixel region in the transport direction. The changing can thus be adapted in a simple fashion to a change of the mentioned circumstances.

Therein it is particularly preferred that upon correcting, upon a second correction the capture pixel data for the at least one sequence and the at least one integration interval which were corrected upon the first correction are changed, in dependence on the capture pixel data and/or the capture pixel data of the same sequence which were corrected upon the first correction for one of the integration intervals that follows, preferably immediately follows, the at least one integration interval, or one of the integration intervals that precedes, preferably immediately precedes, the integration interval, in such a fashion as to reduce an integrated property represented by the capture pixel data. This way of proceeding has the advantage that influences by preceding and following integration intervals can be reduced. Also here the parameters can be chosen analogously to the above described. In particular, preferably the changing can take place upon the second correction additionally in dependence on the transport speed and/or the length of the integration interval and/or the extension of the capture pixel region in the transport direction.

Further, it has been found to be advantageous that for the correction after the first and the second correction the capture pixel data corrected upon the second correction are corrected using a factor that is dependent on the transport speed, the length of the integration interval and the extension of the capture pixel region in the transport direction. This has the advantage that the corrected capture pixel data are corrected in view of the transport, however the influence of this correction on the absolute values can be compensated at least partly.

In a different preferred embodiment it is provided that upon correcting the capture pixel data at least one, preferably contiguous part of the sequence of the capture pixel data is filtered. The filtering can in particular consist in linking the part of the sequence or the complete sequence with a filter function, in particular a filter matrix, wherein the result is preferably again a sequence having the same number of members as the part of the sequence or the whole sequence.

Particularly preferably for filtering the part of the sequence can be folded using a preferably symmetric filter function. Particularly preferably as filter function a filter matrix is employed; the folding then consists in a multiplication of a vector formed of the part of the sequence, preferably a vector formed of the complete sequence, and the filter matrix which is preferably symmetric. The multiplication with the vector can in particular be executed such that subsequently lines of the filter matrix are multiplied with the sequence or the vector, wherein in the sum only such summands are considered in which the matrix elements are not zero.

Preferably the filter function can drop as the distance increases. The dropping as the distance increases is understood to mean particularly in the case of a filter matrix that the amounts of the elements in a column or in a line, preceding from the diagonal of the matrix, become smaller as the number of the line or of the column increases and decreases.

Particularly good results can be obtained when the filter function changes sign at least once as the distance increases. In the case of a filter matrix this means that at least two consecutive elements of a line of the filter matrix which are not zero have a different sign.

In principle the filter function, in particular the filter matrix, can be determined by experiment. However, preferably there is determined, for a sequence of property values representing the optical property of fields mutually adjacent in the transport direction, said fields respectively having the extension of a capture pixel region and optical properties that are constant over said extension and being transported through the capture pixel regions in the transport direction at a specified transport speed, for the given extension of the capture pixel regions, capture time intervals, transport speed and integration intervals, a transfer function by means of which a sequence of expected capture pixel data can be determined from the sequence of property values, and the filter function is determined at least approximately from the transfer function. Preferably as transfer function a transfer matrix is employed, the filter function can then in particular be the inverse of the transfer matrix or an approximation for the inverse. In the case of the approximation the maximum percentaged deviation of the values of the elements of the filter matrix from the corresponding values of the elements of the exact matrix is preferably smaller than 5%, particularly preferably smaller than 1%.

BRIEF DESCRIPTION OF THE DRAWINGS

The invention will hereinafter be explained further by way of example with reference to the drawings. The figures are described as follows:

FIG. 2 a schematic view of a part of a sensor device of the apparatus in FIG. 1 in the transport direction, FIG. 3 diagrams illustrating the movement of value-document pixel regions through a capture pixel region of the sensor device in FIG. 1, FIG. 4 diagrams which illustrate the overlap F of value-document pixel regions and the capture pixel region in FIG. 3 as a function of the time t and the integration function of a capture element of the sensor device in FIG. 3 as a function of the time t, FIG. 5 a roughly schematic flowchart for a first method for generating a digital image, and FIG. 6 a roughly schematic flowchart of a second method for generating a digital image.

DETAILED DESCRIPTION OF PREFERRED EMBODIMENTS

Figure 1:
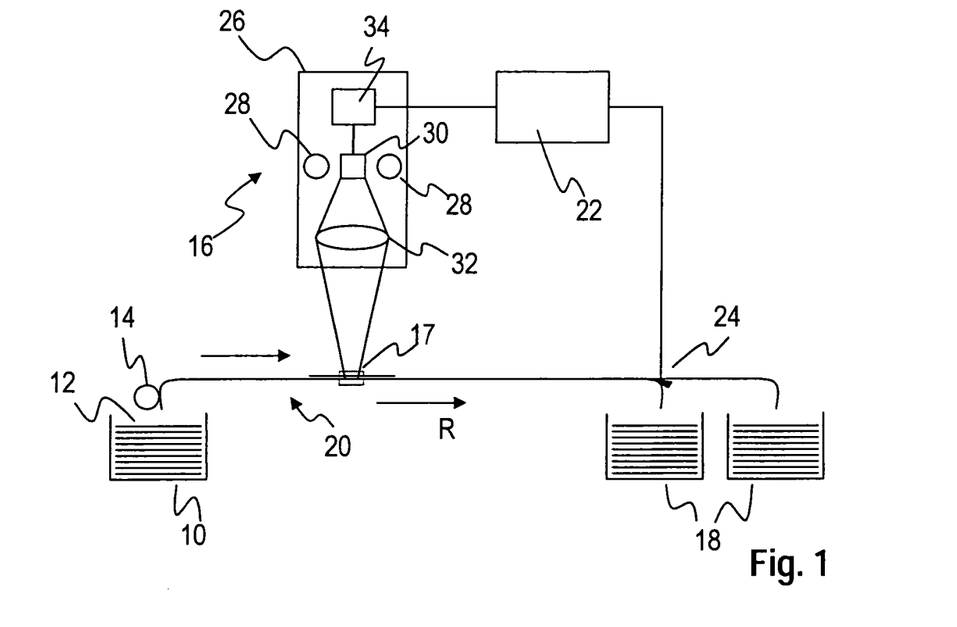
FIG. 1 a schematic view of a value-document processing apparatus.

A value-document processing apparatus in FIG. 1, in the example a banknote processing apparatus for sorting banknotes in dependence on their authenticity and/or state, has an input region 10 for receiving stacked value documents 12, in the example banknotes, a singler 14 for singling value documents 12 from the input region 10, a sensor device 16 for capturing at least one specified property of the singled value documents 12 in a capture region 17 of the sensor device 16, in the example of an image, and output pockets 18 for receiving value documents 12 checked by means of the sensor device and a transport device 20 for transporting the value documents from the singler 14 in a transport direction R through the capture region 17 to the output pockets 18. The value-document processing apparatus further comprises a control device 22, which is connected via signal connections with the sensor device 16 and the transport device 20 and controls the transport device 20 in dependence on signals of the sensor device 16. The sensor device 16 captures the image and determines, in dependence on the captured image, whether the value document fulfills at least one specified criterion for the authenticity and/or the state of the value document, and generates a signal that represents the result of the check. The control device 22 captures the signal and, in dependence on this signal, drives the transport device 20, in the example a gate 24, such that the value document captured by the sensor device 16 is transported in accordance with the result of the check to a specified one of the output pockets 18. In other exemplary embodiments at least one further sensor device can be provided, which captures properties of a singled value document transported by the transport device 20, checks a specified criterion for the respective captured property and emits a corresponding signal representing the result of the check to the control device 22. The control device 22 can then drive the transport device 20 additionally in dependence on this signal.

Figure 2:
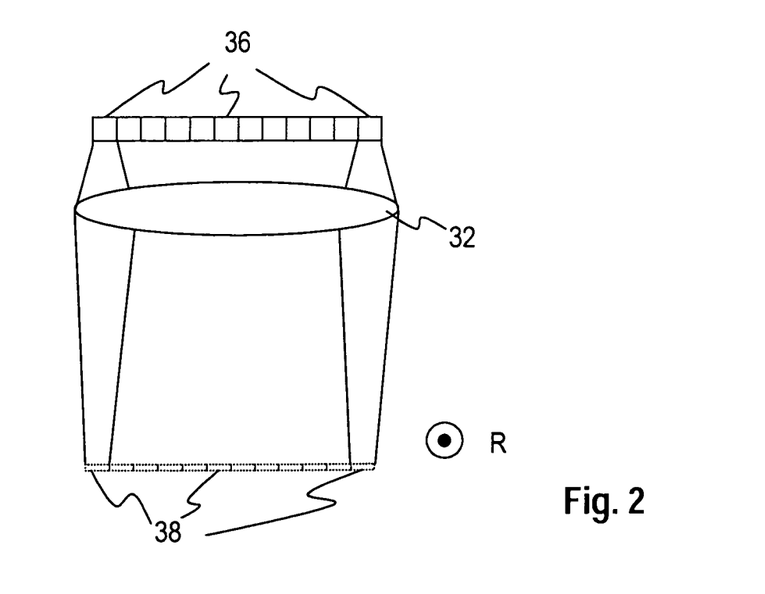

The sensor device 16 represented in FIG. 2 in greater detail, but only schematically, comprises in a sensor housing 26 among other things an illumination device 28 for illuminating the capture region 17 with optical radiation in at least one specified wavelength range, in the example with white light and IR radiation, a line camera 30 for capturing optical radiation coming from the capture region in the specified wavelength rages and an imaging optic 32 for imaging the capture region onto the line camera 30, i.e. for focusing the optical radiation coming from the capture region 17 on the line camera 30. The housing 26 has a window through which the radiation coming from the capture region can get to the imaging optic 32. Further, the sensor device 16 has an evaluation device 34 that serves, among other things, as a correction device within the meaning of the invention, receiving the signals of the line camera 30 and evaluating them. In particular, it is configured, together with the line camera 30, to carry out the method described hereinafter for generating a digital image of at least one portion of a value document, in the example of a portion over the complete extension of the value document in the transport direction R.

The value documents are transported in a transport plane, which in FIG. 1 is orthogonal to the drawing plane parallel to the transport direction R, in which the value documents are transported through the capture region 17. The line camera 30 has at least one line of capture elements 36, in the following referred to as sensor elements, in the example four lines of sensor elements. In front of each line a filter is disposed, by means of which the radiation impinging on the line from the capture region 17 is filtered. In the example filters are provided for red, green and blue light and infrared radiation. Since the lines are configured uniformly apart from the configuration of the not shown filters, in the following only one line and the processing of the signals of the sensor elements of the line will be further described. Each of the sensor elements is connected with the evaluation device 34 via a signal connection via which the evaluation device 34 captures the signals of the sensor elements, or reads them out.

As shown schematically in FIGS. 1 and 2, the equally configured sensor elements 36 of a line are disposed along a straight line extending transversely to the transport direction R and parallel to the transport plane. Through this arrangement such capture pixel regions 38 of the capture region are imaged onto the sensor elements 36 which lie correspondingly parallel transversely to the transport direction R, so that one capture pixel region 38 is imaged respectively exactly onto one of the sensor elements 36. Therefore one sensor element is allocated to each capture pixel region and vice versa.

Since the sensor elements work uniformly and the processing of the signals of the sensor elements takes place in the same fashion, in the following the operation mode and the signal processing need to be described only for one sensor element.

Figure 4:
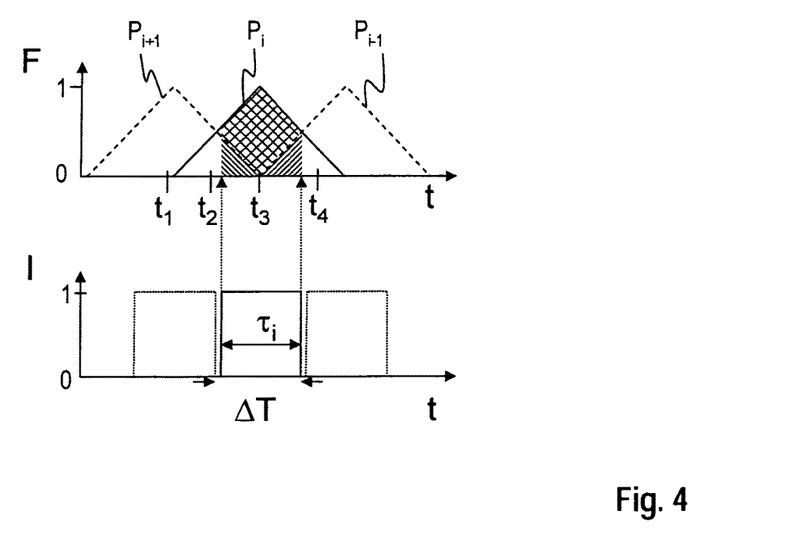

During the transport of the value document past the sensor device 16 the intensities of the optical radiation impinging on the respective sensor elements are captured by the sensor elements within specified, immediately consecutive capture time intervals $\Delta T$, which are equally long in the present example, and are transformed into sensor signals, respectively (cf. FIG. 4).

More exactly each of the sensor elements, over specified integration intervals $\tau$ within the capture time intervals, captures the complete optical radiation reaching the respective sensor element and forms therefrom a sensor signal for the respective integration interval. Therein the intensity of the optical radiation impinging on the sensor element, i.e. of the optical radiation that comes from the allocated capture pixel region and is filtered by one of the mentioned filters, is captured in a locally integrating fashion over the capture pixel region and in a temporally integrating fashion over the respective integration interval, so that the sensor signal reproduces the corresponding radiation energy. The integration intervals in the present exemplary embodiment are equally long and lie at the same place within the corresponding capture time intervals, for example at the end.

Frequently the integration intervals are somewhat shorter than the capture time intervals so as to make a reading out of the sensor elements possible.

By capturing the property of the optical radiation in the specified capture time intervals or integration intervals within the capture time intervals, there arises a time sequence of sensor signals which are allocated to the respective sensor element and thus the corresponding capture pixel region. The evaluation device 34 forms from this sequence of sensor signals, provided that the sensor signals are not already digitized by digitizing them, a time sequence of capture pixel data which represent the property value of the captured optical radiation respectively represented by the sensor signals, in the example of the radiation energy.

Through the simultaneous transport of the value document past the sensor device 16 there corresponds a local sequence of capture pixel data to this time sequence of capture pixel data for one sensor element or to the capture pixel region allocated thereto, said local sequence of capture pixel data corresponding at least approximately to pixel data of a local sequence of pixels on the value document in the transport direction R. Together with the local resolution transversal to the transport direction R, by employing the line of sensor elements, thus an image of the value document can be obtained that is formed by the evaluation device 34.

Figure 3:
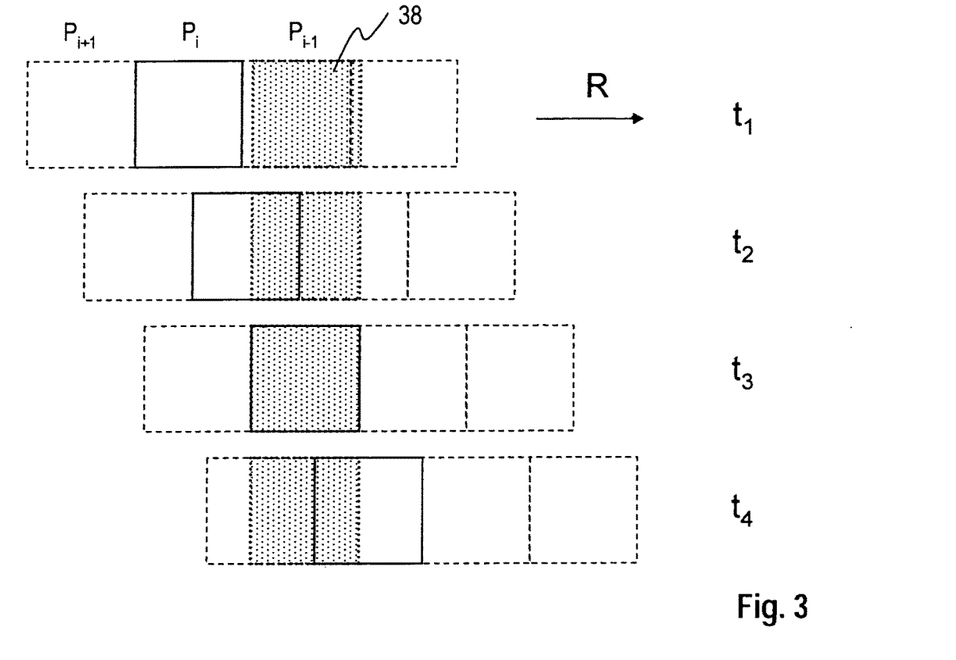

As illustrated in FIGS. 3 and 4, however, at high transport speeds the conformity decreases between a value of the property of the captured optical radiation represented by capture pixel data and the corresponding value in a stationary value document. This is due to the circumstance that during the integration interval there is captured a region of the value document which is larger, more exactly longer in the transport direction, than the corresponding extension of the capture pixel values region. Partial regions within the region, however, are located within the capture pixel region for different durations.

This is illustrated in FIGS. 3 and 4. In FIG. 4 there are shown, merely for the sake of easier understanding, four value-document pixel regions $P_{i-2}$, $P_{i-1}$, $P_i$ and $P_{i+1}$ that are disposed immediately subsequently in the transport direction on a value document that is transported past the sensor device and to be captured by said sensor device, at four consecutive times $t_1$, $t_2$, $t_3$ and $t_4$. i herein designates a natural number. The value-document pixel regions are transported through the capture pixel region 38 illustrated by a dotted area. At the time $t_1$ the value-document pixel region $P_i$ is not yet in the capture pixel region 38 and at the time $t_2$ a little less than half. At the time $t_3$ the two pixel regions are congruent, afterwards the value-document pixel region $P_i$ travels out of the capture pixel region 38 again, wherein the next value-document pixel region $P_{i+1}$ enters the capture pixel region 38. In the upper diagram in FIG. 4 this is again illustrated. Therein the overlap F for the value document pixels $P_{i-1}$, $P_i$ and $P_{i+1}$ with the capture pixel 38 is represented as a function of the time t; a complete overlap corresponds to the value 1. This value of overlap indicates how much the respective value-document pixel region or the radiation coming from there contributes to the value at the time t captured by the sensor element allocated to the capture pixel region. The sensor element integrates the contributions respectively over the integration intervals $\tau_i$. This is shown in the lower diagram in FIG. 4, in which the quantity I as a function of the time t indicates whether the sensor element integrates, value 1, or not, value 0. The value determined by the sensor element for the allocated capture pixel region is proportional to the areas under the curves in the F-t diagram during the integration interval. The corresponding areas are illustrated by hatchings, wherein in the figure the contributions of the value-document pixel regions $P_{i-1}$ and $P_{i+1}$ partly cover those of the pixel region $P_i$.

The time period between two consecutive integration intervals is employed for reading out the sensor elements.

The lengths of the capture time intervals and the integration intervals $\tau$ in the capture time intervals are chosen in dependence on the transport speed and the extension of the capture pixel regions in the transport direction R.

The signals of the sensor element represent a time sequence of capture pixel data $D_i$, for the integration intervals $\tau_i$, wherein the index i simultaneously represents the order of capture and corresponds to the index of the respective value-document pixel region, which had the maximum overlap with the capture pixel region during the respective integration interval.

The sequence of the capture pixel data $D_i$ thus represents an approximate image of a track on the value document, which is formed by the captured value-document pixel regions $P_i$. These capture pixel data $D_i$ can therefore be employed as pixel values of the image.

The data $D_i$ are formed from the sensor signals and further processed in the evaluation device 34. The evaluation device 34 for this purpose has a data processing device with a processor and a memory, in which there is stored a program for carrying out the method described in the following and illustrated in FIG. 5, when the program is executed by means of the processor. Insofar the evaluation device 34 represents a correction device within the meaning of the invention.

Again only the method steps for one capture pixel region are described, those for the other capture pixel regions and colors are correspondingly interlaced or processed successively.

Initially (cf. FIG. 5) capture pixel data are captured in a first portion and subjected to a first correction. This portion comprises in FIG. 5 the partial steps S10 and S12, which are carried out in a mutually interlaced fashion in the present exemplary embodiment.

Figure 5:
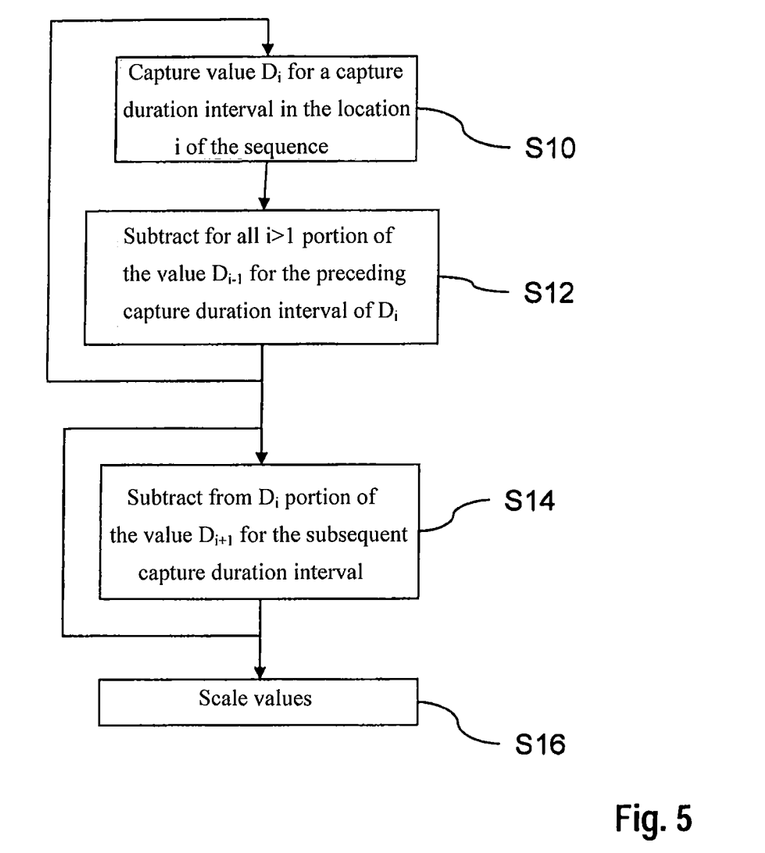

In a loop over a sequence of capture pixel data initially a value $D_i$ is captured for an integration interval in the location i of the sequence, wherein the value i=1 is the first value of the sequence for the respective value document and i is incremented by 1 for each loop run. The maximum number of values of the sequence is N.

The following partial step S12 is executed only for values i>1. In this step there is subtracted from the value $D_i$ the product of a factor V and the value $D_{i-1}$ for the immediately preceding integration interval, and the result is stored a new, now corrected value $D_i'$. Therein V is specified in dependence on the transport speed, the length of the capture time interval, the length of the integration interval and the extension of the capture pixel region parallel to the transport direction R and is a positive value smaller than 1. If the lengths of the intervals vary in different exemplary embodiments, the factor can also be varied correspondingly. It is then specified adapted for the lengths of the integration intervals i.

If it is detected in step S10 that the value document has left the capture pixel region, the loop ends. Thereby such influences are compensated at least approximately which are due to the circumstance that during the capture of a value-document pixel region the preceding value-document pixel region partly overlaps with the capture pixel region.

In a subsequent loop over the values i a second correction is carried out. For this purpose the process is started with i=N and i is decremented by 1 upon every loop run. In step S14, which is not carried out for the last element of the sequence, i.e. for i=N, there is subtracted from each corrected value $D_i'$ the product of a factor H and the value $D_{i+1}'$ for the immediately subsequent integration interval and the result is stored as a new, now twice corrected value Di'. Therein H is specified in dependence on the transport speed, the length of the capture time interval, the length of the integration interval and the extension of the capture pixel region parallel to the transport direction, and is a positive value smaller than 1. If the lengths of the time duration intervals vary in different exemplary embodiments, the factor can also be varied correspondingly.

By the second correction such influences are corrected at least approximately which are due to the circumstance that already during the capture of a value-document pixel region the subsequent value-document pixel region partly overlaps with the capture pixel region.

V and H do not need to be equal, but in the present example V=H is chosen.

In the following step S16 the twice corrected capture pixel data $D_i''$ are scaled by a factor N, which can be specified in dependence on the factors V and H and thus in dependence on the transport speed, the length of the capture time interval, the length of the integration interval and the extension of the capture pixel region parallel to the transport direction. The value of N is preferably larger than 1. Thereby such influences of the two corrections on the capture pixel data can be compensated that result in a reduction of the amounts of the capture pixel data.

The data $D_i''$ can now be employed in the evaluation device as pixel data of an image of the track on the value document and further processed using known methods.

Figure 6:
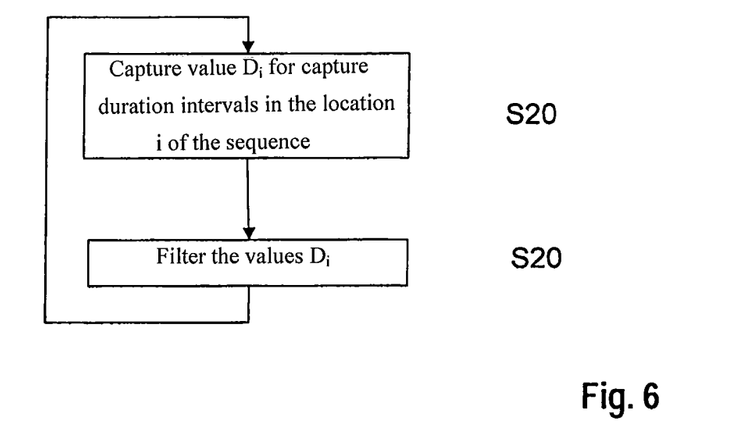

A second exemplary embodiment illustrated in FIG. 6 differs from the first exemplary embodiment through the correction of the capture pixel data and the configuration of the evaluation device. The method steps of the correction are now executed in an FPGA forming part of a correction device within the meaning of the invention, said FPGA passing the results on to a processor of the evaluation device. In the following only the processing for one track is described, like in the first exemplary embodiment, and it is assumed that capture pixel data are captured for one track of the value document and one wavelength channel N.

In the method, like in the first embodiment, capture pixel data $D_i$ are captured in steps S20 corresponding to the steps S10.

The captured capture pixel data of the sequence are processed as follows:

The sequence of the capture pixel data $D_i$ is subjected to a filtering, for which vectors $F_i$ are employed, which, depending on the value, have i to $2*n+1$ components, with n herein being a specified natural number larger than 0 that is chosen in dependence on the desired exactness of the correction.

If there is valid $2*n<i<N-n-1$, a multiplication of a $(2*n+1)$-dimensional vector $F_i$ having the components $F_{ij}$ (j=1, ..., $2*n+1$) is carried out with a vector $d_i$ formed of the capture pixel data $D_{i-n}, \ldots, D_i, D_{i+n}$, whose result is employed as a corrected value $D_i'$ for $D_i$:

$$D_i' = F_i * d_i$$

The values of the components of $F_i$ are chosen in dependence on the transport speed, the extension of the capture pixel region in the transport direction, the duration of the capture time interval and the duration of the integration interval and is equal for a given j for $n<i<N-n$.

For capture pixel data $D_i$ with $i<n+1$ the vector $d_i$ comprises only the components $D_i, \ldots, D_i, \ldots D_{i+n}$; then there is employed for $i<n+1$ instead of a vector $F_i$ for $n<i<N-n$ only a vector $F_i'$ with the last n+i components of the vector $F_i$:

$$D_i' = F_i' d_i$$

If N is the total number of the capture pixel data, the vector $d_i$ comprises for the capture pixel data $D_i$ with $i>N-(n+1)$ only the N-i+n components $D_{i-n}, \ldots, D_i, \ldots D_N$; instead of the vector $F_i$ for $n<i<N-n$ in the multiplication there is then employed only a vector $F_i''$ with the leading 2*n+1-i components of the vector $F_i$:

$$D_i' = F_i'' * d_i$$

This procedure corresponds to a multiplication of a vector with the components $D_i$, i=1, ..., N with a band-shaped filter matrix f with elements $f_{ij}$ in the line i in the column j (i, j=1, ..., N).

The matrix elements $f_{ij}$ are then given as follows:

For $i<n+1$ $f_{ij}=F_{ij}'$ for $j=1, i+n$, 0 else, for $n<i<N-n$ $f_{ij}=F_{ij}$ for $j=i-n, \ldots, i+n$, 0 else, and for $N-n-1<i<N+1$ $f_{ij}=F_{ij}'$ for $j=i-n, \ldots, N$, 0 else.

This matrix is symmetrical in the present exemplary embodiment.

The vectors $F_i$ for $n<i<N-n$ are thus also symmetrical with regard to the middle element. Further, the components in this exemplary embodiment continuously change their sign proceeding from the middle element. The vector $F_i$ can for example be given for $n<i<N-n$ as follows:

$(-2\times10^{-4}; 10^{-3}; -7\times10^{-3}; 0.04; -0.2; 1.4; -0.2; 0.04; -7\times10^{-3}; 10^{-3}; -2\times10^{-4})$ The vector $F_i'$ can then comprise for $i<n+1$ the i+n right components of the vector $F_{n+1}$, and the vector $F_i''$ for $i>N-n-1$ can then comprise the i+n left components of the vector $F_{n+1}$.

The matrix f can be approximately obtained by assigning a target capture pixel value $D_i^0$ to each of the value-document pixel regions i. Then the capture pixel values $D_i$ to be expected can be computed as a function of the target capture pixel values $D_i^0$, wherein the initially described model and specified values for the transport speed, the extension of the capture pixel region in the transport direction, the duration of the capture time intervals and the duration of the integration intervals are employed. If d designates the vector of the capture pixel values $D_i$ to be expected, and $d^0$ the vector of the target capture pixel values $D_i^0$, there results an interrelation in the form $$d = g * d^0$$

g therein is a band matrix which represents a transfer function. By approximate or preferably exact inversion of g there results the filter matrix f. Its entries can partly be set to zero in dependence on an acceptable error.

A further exemplary embodiment differs from the second exemplary embodiment in that no FPGA is used and the capture pixel data are stored first in the correction device, i.e. the evaluation device. When all capture pixel data of a sequence are present, the filtering or multiplication with the filter matrix is carried out.

The invention claimed is:

1. A method for generating a digital image of at least a portion of a value document, the method comprising:
   transporting the portion of the value document in a specified transport direction at a specified speed through capture pixel regions, each of the capture pixel regions being arranged along a line extending transverse to the transport direction, wherein each of the capture pixel regions extends in the transport direction,
   capturing, during said transport, for each of said capture pixel regions arranged along the line transverse to the transport direction, during integration intervals of at least one specified sequence of integration intervals, at least one property of optical radiation coming from the respective capture pixel region,
   generating a time sequence of capture pixel data respectively allocated to the integration intervals, said capture pixel data reproducing the property of the optical radiation from the respective capture pixel region, integrated over the respective integration interval and the respective capture pixel region, and
   employing the sequences of capture pixel data as pixel data for spatial sequences of pixels along the transport direction for the digital image of the portion of the value document,
   wherein capture pixel data of the at least one specified sequence of capture pixel data are corrected to reduce an effect on the capture pixel data specifically due to said specified speed of said transporting of the value document in the transport direction during the capture of the capture pixel data, wherein, when correcting capture pixel data for a respective capture region and allocated to an integration interval, capture pixel data of the same specified sequence for the same respective capture region that are allocated to different integration intervals are employed independently from capture pixel data of other sequences,
   wherein said correcting of said capture pixel data includes correcting said capture pixel data based at least in part on at least one factor depending on two or more of:
   (i) the specified speed of said transporting of the value document in the transport direction,
   (ii) a length of the integration interval, and
   (iii) an extension of the capture pixel region in the transport direction, and
   wherein said correcting includes subtracting from a first capture pixel, a product of one of said at least one factor and a second capture pixel data of an integration interval which immediately precedes or immediately follows said first capture pixel.

2. The method according to claim 1, wherein, said correcting comprises a first capture pixel data of a sequence being corrected before all capture pixel data of the sequence are available.

3. The method according to claim 1, wherein said correcting comprises a correction of the capture pixel data of the at least one sequence, and a first correction comprising first changing the capture pixel data for at least one of the integration intervals of the sequence of the integration intervals in dependence on the capture pixel data of the same sequence for one of the integration intervals that precedes, preferably immediately precedes, the integration interval or an integration interval that follows, preferably immediately follows, the integration interval, to reduce an integrated property represented by the capture pixel data.

4. The method according to claim 3, wherein the changing of the capture pixel data upon the first correction additionally takes place in dependence on the transport speed and/or the length of the integration interval and/or the extension of the capture pixel region in the transport direction.

5. The method according to claim 3, further comprising a second correction comprising changing the capture pixel data for the at least one sequence and the at least one integration interval which were corrected upon the first correction, in dependence on the capture pixel data and/or the capture pixel data of the same sequence which were corrected upon the first correction for one of the integration intervals that follows, preferably immediately follows, the at least one integration interval, or one of the integration intervals that precedes, preferably immediately precedes, the integration interval, to reduce a second integrated property represented by the capture pixel data.

6. The method according to claim 5, wherein the changing takes place additionally in dependence on the transport speed and/or the length of the integration interval and/or the extension of the capture pixel region in the transport direction.

7. A method for generating a digital image of at least a portion of a value document, the method comprising:
   transporting the portion of the value document in a specified transport direction at a specified speed through capture pixel regions, each of the capture pixel regions extending in the transport direction and the capture pixel regions being arranged transverse to the transport direction,
   capturing, during said transport for the capture pixel regions respectively during integration intervals of at least one specified sequence of integration intervals, at least one property of optical radiation coming from the respective capture pixel region, and generating a time sequence of capture pixel data respectively allocated to the integration intervals, said data reproducing the property of the optical radiation from the respective capture pixel region, integrated over the respective integration interval and the respective capture pixel region, and
   employing the sequences of capture pixel data as pixel data for local sequences of pixels along the transport direction for the digital image of the portion of the value document,
   wherein capture pixel data of at least one of the sequences of capture pixel data are corrected, while employing the capture pixel data of the same sequence that are allocated to respectively different integration intervals, to reduce an influence of a movement of the value document in the transport direction during the capture of the capture pixel data on the capture pixel data,
   wherein said correcting of the capture pixel data of the at least one sequence comprises a first correction comprising first changing the capture pixel data for at least one of the integration intervals of the sequence of the integration intervals in dependence on the capture pixel data of the same sequence for one of the integration intervals that precedes, preferably immediately precedes, the integration interval or an integration interval that follows, preferably immediately follows, the integration interval, to reduce an integrated property represented by the capture pixel data, and
   said correcting further comprises a second correction comprising changing the capture pixel data for the at least one sequence and the at least one integration interval which were corrected upon the first correction, in dependence on the capture pixel data and/or the capture pixel data of the same sequence which were corrected upon the first correction for one of the integration intervals that follows, preferably immediately follows, the at least one integration interval, or one of the integration intervals that precedes, preferably immediately precedes, the integration interval, to reduce a second integrated property represented by the capture pixel data,
   wherein, after the first and the second correction further correcting the capture pixel data corrected upon the second correction with a factor depending on the transport speed, the length of the integration interval and the extension of the capture pixel region in the transport direction.

8. The method according to claim 1, wherein, said correcting the capture pixel data, comprises filtering at least one, preferably contiguous, part of the sequence of the capture pixel data.

9. The method according to claim 8, wherein the filtering comprises folding the part of the sequence with one, preferably symmetric, filter function.

10. The method according to claim 9, wherein the filter function drops as the distance increases.

11. The method according to claim 9, wherein the filter function changes sign at least once as the distance increases.

12. An apparatus for determining a digital image of at least a portion of a value document from sequences of capture pixel data, obtained by transporting the portion of the value document in a specified transport direction at a specified speed through capture pixel regions extending respectively in the transport direction, and capturing during said transport for the capture pixel regions respectively during integration intervals of a specified sequence of integration intervals at least one property of optical radiation coming from the respective capture pixel region, and generating a time sequence of capture pixel data respectively allocated to the capture time intervals, which reproduces the property of the optical radiation from the respective capture pixel region, integrated over the respective integration interval and the respective capture pixel region, wherein the apparatus comprises a correction device which is configured so as to execute the method according to claim 1.

13. An apparatus for generating a digital image of at least a portion of a value document, having an image capturing device on which the portion of the value document is transportable in a specified transport direction at a specified speed through capture pixel regions extending in the transport direction, said device configured to capture during said transport, for the capture pixel regions respectively during integration intervals of a specified sequence of integration intervals, at least one property of optical radiation coming from the respective capture pixel region, and configured to generate a time sequence of capture pixel data respectively allocated to the capture time intervals, which reproduce the property of the optical radiation from the respective capture pixel region, integrated over the respective integration interval and the respective capture pixel region, and comprising the apparatus for determining a digital image according to claim 12.

* * * * *